Patented May 22, 1951

2,553,989

UNITED STATES PATENT OFFICE 2,553,989

HEMICYANINE DYESTUFFS

André Emile van Dormael, Heverlee-Louvain, Belgium, assignor to Gevaert Photo-Producten N. V., Mortsel-Antwerp, Belgium, a company of Belgium No Drawing. Application March 4, 1948, Serial No. 13,081. In Great Britain March 14, 1947

8 Claims. (Cl. 260—240.8)

This invention relates to hemicyanine dyestuffs and a process of preparing same.

According to the nomenclature adopted herein, simple hemicyanine dyestuffs are such as correspond to the following general formula:

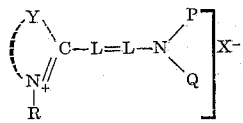

whereas dyestuffs corresponding to the following general formula:

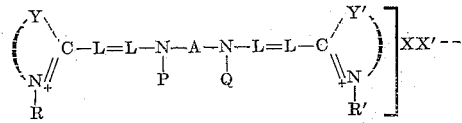

are termed double hemicyanine dyestuffs. The latter formula embraces symmetrical as well as unsymmetrical compounds.

In the above two formulae, Y and Y' represent the non-metallic atoms necessary to complete a heterocyclic 5- or 6-membered ring, R, R', P and Q represent H or a hydrocarbon residue, L represents a methine group which may be substituted, and X and X' represent an acid residue.

It is known to sensitize photographic silver halide emulsions by means of symmetrical double hemicyanine dyestuffs corresponding to the following general formula:

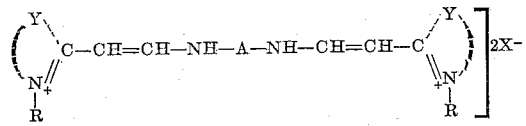

wherein Y represents the non-metallic atoms necessary to complete a 5- or 6-membered heterocyclic ring or ring system known in the chemistry of the cyanines, R represents alkyl or aryl, X represents an acid residue, and A represents a chemical bond or a bivalent aromatic radical, for instance, phenylene, diphenylene, napthylene; a bivalent radical derived from diphenyl methane, diphenyl ether, benzophenone, diphenyl amine, stilbene.

The said dyestuffs may be obtained by allowing a diamine, such as hydrazine or an aromatic diamine, to react with a quaternary salt of a heterocyclic nitrogen compound having a reactive beta-acetyl anilido vinyl grouping, or with a 2-formyl methylene heterocyclic nitrogen-containing base.

It is the primary object of my invention to provide a new process for the preparation of a variety of hemicyanine dyestuffs.

It is another object of my present invention to provide new unsymmetrical double hemicyanine dyestuffs.

Still another object of this invention is to provide new compounds which are symmetrical double hemicyanine dyestuffs, but substituted in the polymethine chain.

A still further object of my invention is to provide a process for the preparation of unsymmetrical double hemicyanine dyestuffs as well as symmetrical dyestuffs substituted in the polymethine chain.

A still further object of my invention is to provide a process for the preparation of simple hemicyanine dyestuffs which are useful as intermediate products in the preparation of the double hemicyanine dyestuff above referred to.

Other objects of this invention will appear from the following description.

I have found that simple hemicyanine dyestuffs according to the following formula:

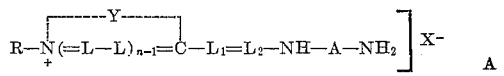

may be obtained by allowing an excess of a primary aromatic diamine or a salt of such a diamine to react upon intermediate products, such as cyclammonium salts, having a vinyl group or a substituted vinyl group linking the carbon atom in alpha- or gamma-position to the N atom, with a reactive group, such as aryl-, alkyl- or aralkyl ether, -thioether or -seleno ether, or an amino or substituted amino group, including acyl-, aryl- and acylaryl amino groupings or 2-acyl-, 2-thioacyl-, 2-formyl- or 2-thioformyl methylene heterocyclic N-containing bases.

Surprisingly, no symmetrical double hemicyanine dye-stuff was formed by these reactions.

I have also found that symmetrical double hemicyanines bearing substituents in the polymethine chain, or unsymmetrical double hemicyanines corresponding to the following formula:

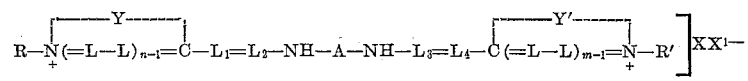

wherein Y and Y' represent the non-metallic atoms necessary to complete a 5- or 6-membered heterocyclic N-containing ring, which may form part of a ring system known in the chemistry of the cyanines, and may, if desired, bear one or more substituents, A represents a chemical bond or bivalent aromatic radical, R and R' represent substituted or non-substituted alkyl, alkylene or aryl, L, $L_1$, $L_2$, $L_3$, $L_4$ represent a substituted or non-substituted methine group, X and X' represent an acid residue, and $n$ and $m$ represent 1 or 2, may be obtained by condensing said simple hemicyanine dyestuffs (Formula A) with the above defined intermediate products.

In the foregoing formula B and in the case of symmetrical dyestuffs, $L_1$, $L_4$ represent methine group, X and X' represent an acid residue, and $n$ and $m$ represent 1 or 2, may be obtained by condensing said simple hemicyanine dyestuffs (Formula A) with the above defined intermediate products.

In the foregoing Formula B and in the case of symmetrical dyestuffs, $L_1$, $L_4$ represent methine groups, $L_2$, $L_3$ represent substituted methine groups; further, in the case of unsymmetrical dyestuffs, any of the following differences may appear: Y and Y' are different either by completing different rings or by completing similar rings which bear different substituents, the groups —$L_1$=$L_2$— and —$L_3$=$L_4$— are different, R and R' are different, or X and X' are different.

These double hemicyanines may also be obtained by condensing a cyclammonium salt having a reactive methyl- or methylene group or the corresponding methylene base simultaneously with an ortho ester and said simple hemicyanine dyestuff.

The preparation of the simple and double hemicyanines according to the invention may be illustrated by the following diagram.

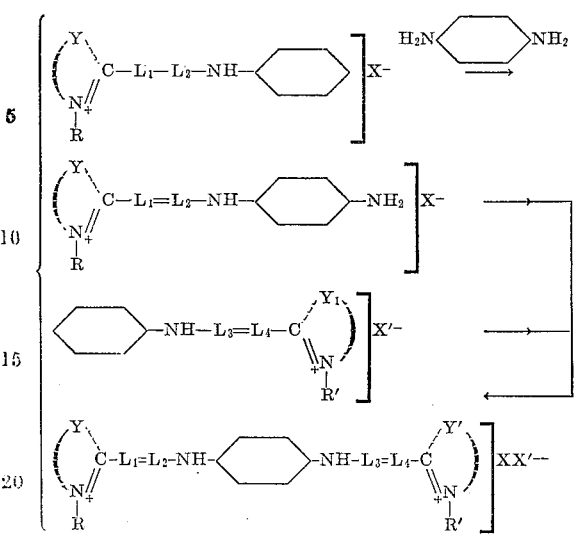

It has been found that many of the said double hemicyanines are valuable dyestuffs for modifying the spectral sensitivity of photographic silver halide emulsions. They are of particular value for sensitizing silver chloride or silver bromo-chloride emulsions.

In comparison with the known symmetrical double hemicyanines, the class of the unsymmetrical double hemicyanine dyestuffs described herein offers the advantage of including a greater number of different dyestuffs having different sensitizing properties. Hence, it is easier to find in this class a member having the sensitizing properties required for each particular purpose in view.

As already known in connection with the symmetrical hemicyanines, the hemicyanines according to the present invention may more easily be washed out of the photographic material when the diamine residue —NH—A—NH— bears acid substituents, such as carboxylic or sulphonic acid groups.

These acid groups may also be introduced in the R or R' groups.

The following examples illustrate the present invention without limiting, however, its scope.

*Example 1*

11 g. 2-(beta-acetanilido-vinyl)-benzothiazolethiodide and 8 g. phenylene-diamine are dissolved in 100 cm.³ ethyl alcohol. This solution is refluxed for 30 minutes on the water-bath. After cooling, the precipitate obtained is recrystallised from alcohol. Melting point is 231°–232° C. The probable formula of the simple hemicyanine is as follows:

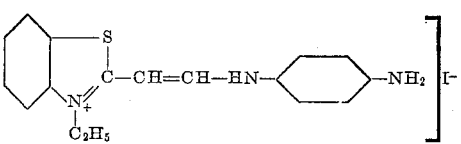

To prepare an unsymmetrical double hemicyanine dyestuff, 5 g. of this simple hemicyanine and 5 g. 2-(beta-acetanilido-vinyl), benzoxazol-ethiodide are dissolved in 100 cm.³ ethyl alcohol. The solution is refluxed for 30 minutes on the water bath. After cooling, the unsymmetrical dyestuff precipitates and is recrystallised from alcohol. Melting point is 294°–295° C. The probable formula is as follows:

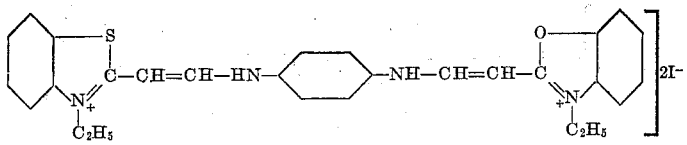

This dyestuff sensitizes a silver chloride emulsion up to 540 mµ very strongly.

*Example 2*

8 g. 2-formyl-methylene-3-ethyl-2,3-dihydro-benzothiazol and 21.5 g. benzidine are dissolved in 100 cm.³ methyl alcohol. This solution is refluxed for 30 minutes on the water bath, and a HCl gas current is introduced. The intermediate product obtained is converted with NaI to the corresponding iodide. Melting point is 270°–271° C. The probable formula is as follows:

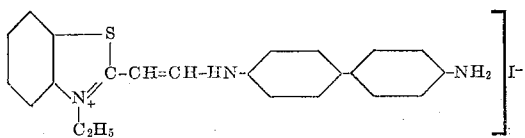

To prepare an unsymmetrical dyestuff, 2.5 g. of this simple hemicyanine and 1.6 g. 2-(beta-anilido-vinyl)-thiozoline-ethiodide are dissolved in 60 cm.³ ethyl alcohol. This solution is refluxed for 30 minutes on the water bath. After cooling, the unsymmetrical dyestuff precipitates. Melting point is 235°–238° C. The probable formula is as follows:

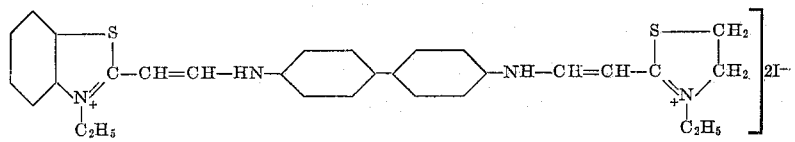

This dyestuff sensitizes a silver chloride emulsion up to 535 mµ very strongly.

*Example 3*

8.7 g. 2 - (beta - acetanilido-vinyl) -benzoxazol-ethiodide and 6.5 g. p-phenylene-diamine are dissolved in 100 cm.³ ethyl alcohol. This solution is refluxed for 30 minutes on the water bath. After cooling, the precipitate obtained is recrystallised from alcohol. Melting point is 213°–214° C. The probable formula is as follows:

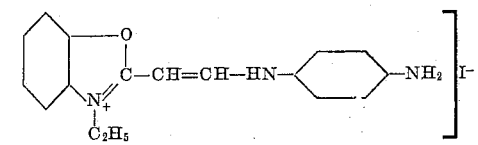

To prepare an unsymmetrical double hemicyanine dyestuff, 4 g. of this simple hemicyanine and 1.5 g. 2-5-dimethyl-benzoxazol-ethiodide are heated with 0.8 g. ortho formic acid ethyl ester for 1 hour at 130° C. on the oil bath. The reaction mass is recrystallised from alcohol. Melting point is 280°–282° C. The probable formula is as follows:

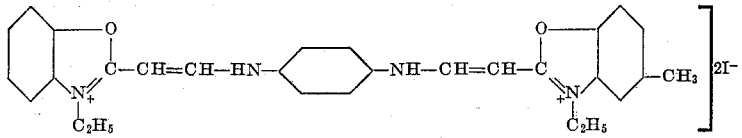

This dyestuff sensitizes a silver chloride emulsion up to 535 mµ very strongly.

*Example 4*

4 g. 2-(beta - methyl - mercapto - beta - ethyl-vinyl) -benzo-thiazol-dimethyl sulphate and 3.2 g. p-phenylene-diamine are dissolved in 85 cm.³ ethyl alcohol. This solution is refluxed for 30 minutes on the boiling water bath. After adding ether, the intermediate product precipitates in crystalline form. Melting point, after recrystallization from alcohol, is 220°–221° C. The probable formula is as follows:

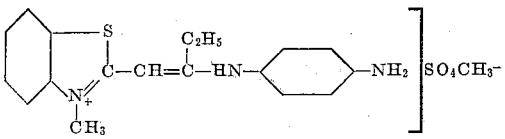

To prepare an unsymmetrical double hemicyanine dye-stuff, 5 g. of this simple hemicyanine and 5 g. 2-(beta-acetanilido - vinyl) -benzoxazol-ethiodide are dissolved in 100 cm.³ ethyl alcohol. This solution is refluxed for 30 minutes on the water bath. The solution is cooled and precipitated with NaI solution, and the dyestuff precipitated is recrystallised from alcohol. Melting point is 251°–252° C. The probable formula is as follows:

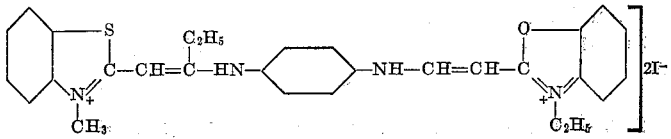

This dyestuff very strongly sensitizes a silver chloride emulsion up to 527 mμ with a maximum at 500 mμ. The sensitizing maximum of a silver chloride emulsion, sensitized with 6 mg. of 3-3'-diethyl-5-5'-diphenyl-9-propyl - oxo - carbocyanine iodide per kg. of emulsion, is raised by adding 30 mg. of the above mentioned unsymmetrical dyestuff per kg.

*Example 5*

5 g. 2-(beta-methyl - mercapto - beta-methyl-vinyl)-benzothiazol-ethyl-methyl sulphate and 0.5 g. p-phenylene-diamine are dissolved in 85 cm.³ ethyl alcohol. This solution is refluxed for 30 minutes on the water bath. After cooling, the dyestuff precipitates and is thrice recrystallised from ethyl alcohol. Melting point is 250°–252° C. The probable formula is as follows:

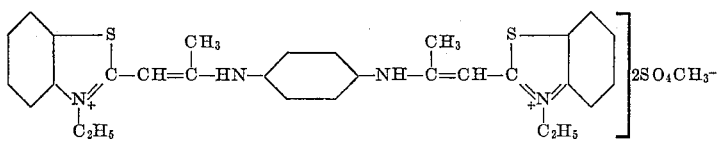

This dyestuff alone sensitizes a silver chloride emulsion up to 530 mμ weakly. In mixture with 10 mg. of 1-1'-diethyl-2-2'-cyanine-iodide per kg. of emulsion, 30 mg. of the above dyestuff per kg. produces a high sensitizing maximum at 575 mμ.

*Example 6*

7.5 g. 2-(beta-methyl - mercapto - beta-ethyl-vinyl)-benzothiazol-dimethyl sulphate and 0.8 g. p-phenylene-diamine are dissolved in 100 cm.³ ethyl alcohol. This solution is refluxed for 30 minutes on the water bath. After cooling, the dyestuff precipitates and is recrystallised from ethyl alcohol. Melting point is 258°–259° C. The probable formula is as follows:

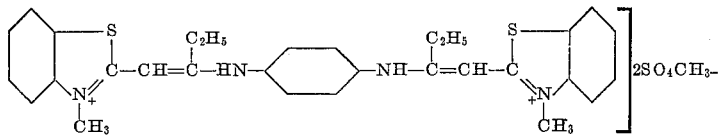

This dyestuff alone sensitizes a silver chloride emulsion up to 520 mμ very weakly. However, a silver chloride emulsion, sensitized with 6 mg. of 3-3'-diethyl-5-5'-diphenyl-9-propyl - oxo-carbocyanine iodide per kg. of emulsion, is supersensitized by adding 30 mg. of the above dyestuff per kg.

*Example 7*

2 g. of the intermediate product according to the first given formula in Example 1 and 2.08 g. 2-(beta-acetanilido-vinyl)-quinoline-ethyl iodide are dissolved in 50 cm.³ ethyl alcohol. This solution is refluxed for 1 hour on the water bath. After cooling, the dyestuff precipitates and is recrystallised from alcohol. Melting point is 230° C. (with decomposition). The probable formula is as follows:

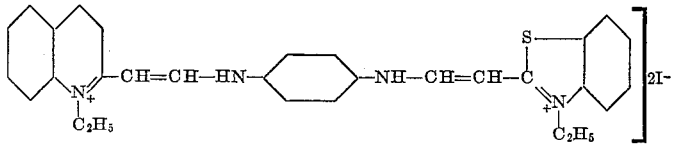

This dyestuf sensitizes a silver chloride emulsion up to 545 mμ.

*Example 8*

4 g. 2-(beta-p-amino-anilido-vinyl)-benzoxazol-ethyl iodide (intermediate product described in Example 3), 1.5 g. 2-methyl-benzoxazol-benzyl bromide and 0.7 g. o-formic acid ethyl ester are first heated at 180° C. for a while and next at 130° C. for 90 minutes. The product obtained is disolved in alcohol, and the dyestuff is precipitated by a KI solution 15%. After recrystallisation from alcohol, the melting point is 277°–278° C. The probable formula is as follows:

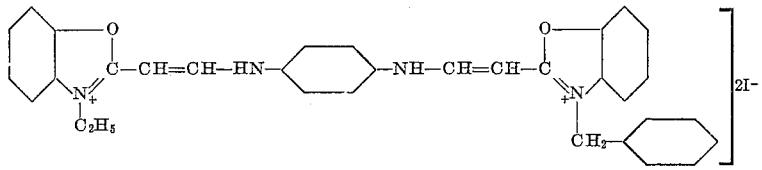

This dyestuff sensitizes a silver bromo-chloride emulsion at 535 mμ very strongly.

It will be apparent that while I have illustrated my invention with the help of specific examples, many changes may be made without departing from the spirit of the invention defined in the following claims.

I claim:
1. Process of preparing a hemicyanine dyestuff coresponding to the following formula:

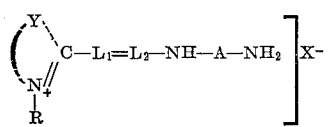

wherein Y represents a member selected from the group consisting of the non-metallic atoms necessary to complete a 5- and 6-membered heterocyclic ring and a 5- and 6-membered heterocyclic ring system known in the chemistry of the cyanines, A represents a bivalent aromatic radical, R represents a member selected from the group consisting of alkyl and aralkyl, $L_1$ and $L_2$ represent a member selected from the group consisting of a methine group and a methine group substituted by alkyl, and X represents an acid residue, by reacting an excess of a primary aromatic diamine upon an intermediate product of the formula:

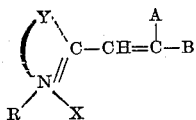

wherein A represents a member selected from the group consisting of hydrogen and alkyl, B represents a member selected from the group consisting of methylmercapto and acylarylamino groups, and Y, R and X have the same significance as indicated above.

2. Process of preparing the simple hemicyanine corresponding to the following formula:

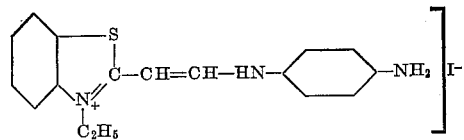

by reacting 2-(beta-acetanilido-vinyl)-benzothiazol-ethiodide and p-phenylene diamine upon each other, the diamine being present in excess.

3. Process of preparing the simple hemicyanine corresponding to the following formula:

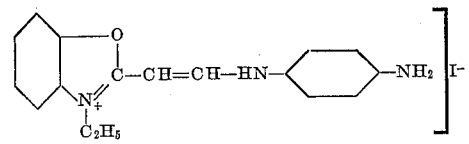

by reacting 2-(beta-acetanilido-vinyl)-benzoxazol-ethiodide and p-phenylene diamine upon each other, the diamine being present in excess.

4. Process of preparing the simple hemicyanine corresponding to the following formula:

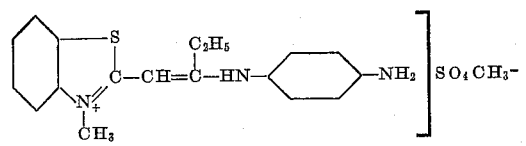

by reacting 2-(beta-methyl-mercapto-beta-ethyl-vinyl)-benzthiazol-dimethyl-sulphate and p-phenylene-diamine upon each other, the diamine being present in excess.

5. The hemicyanine dyestuff corresponding to the formula:

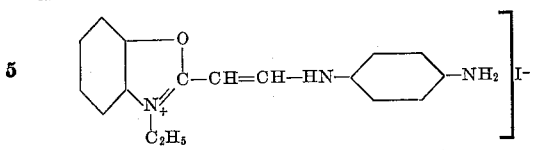

6. The hemicyanine dyestuff corresponding to the formula:

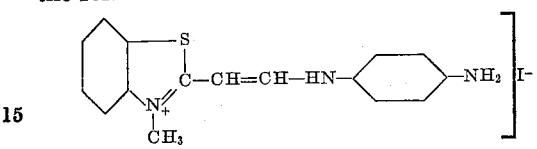

7. The hemicyanine dyestuff corresponding to the formula:

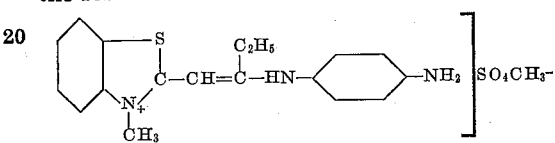

8. A hemicyanine dyestuff corresponding to the following formula:

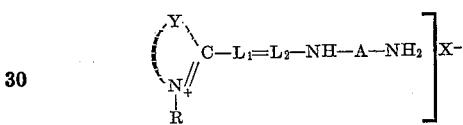

wherein Y represents a member selected from the group consisting of the non-metallic atoms necessary to complete a 5- and 6-membered heterocyclic ring and a 5- and 6-membered heterocyclic ring system known in the chemistry of the cyanines, A represents a bivalent aromatic radical, R represents a member selected from the group consisting of alkyl and aralkyl, $L_1$ and $L_2$ represent a member selected from the group consisting of a methine group and a methine group substituted by alkyl, and X represents an acid residue.

ANDRÉ EMILE van DORMAEL.

REFERENCES CITED

The following references are of record in the file of this patent:

UNITED STATES PATENTS

| Number | Name | Date |
|---|---|---|
| 2,155,475 | Duterle | Apr. 25, 1931 |
| 2,155,459 | Winter | Apr. 25, 1939 |
| 2,307,049 | Kendall | Jan. 5, 1943 |
| 2,340,882 | Kendall | Feb. 8, 1944 |
| 2,368,305 | Kendall | Jan. 30, 1945 |
| 2,369,509 | White | Feb. 13, 1945 |

FOREIGN PATENTS

| Number | Country | Date |
|---|---|---|
| 811,990 | France | 1937 |